United States Patent [19]

Loffelman et al.

[11] 4,412,020
[45] Oct. 25, 1983

[54] NOVEL LIGHT STABILIZERS FOR POLYMERS

[75] Inventors: Frank F. Loffelman; Joseph A. Hoffman, both of Bridgewater, N.J.

[73] Assignee: American Cyanamid Company, Stamford, Conn.

[21] Appl. No.: 284,890

[22] Filed: Jul. 20, 1981

[51] Int. Cl.³ ............................................. C08K 5/34
[52] U.S. Cl. ................................... 524/100; 524/102; 524/103
[58] Field of Search ........................ 524/100, 102, 103

[56] References Cited
U.S. PATENT DOCUMENTS 4,234,728 11/1980 Rody et al. .......................... 524/100
4,294,963 10/1981 Rody .................................... 524/100

Primary Examiner—John Kight, III
Assistant Examiner—Kriellion Morgan
Attorney, Agent, or Firm—Steven J. Hultquist

[57] ABSTRACT

Oligomers of the formula:

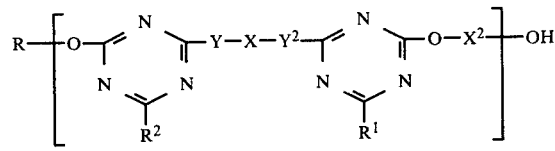

wherein at least one of the substituents contains a piperidyl group are disclosed as light stabilizers for polymers. Also disclosed is a method for stabilizing a polymer which is normally subject to degradation by ultraviolet radiation, by incorporating therein an ultraviolet stabilizingly effective amount of such oligomer.

20 Claims, No Drawings

NOVEL LIGHT STABILIZERS FOR POLYMERS

Oligomers of the formula:

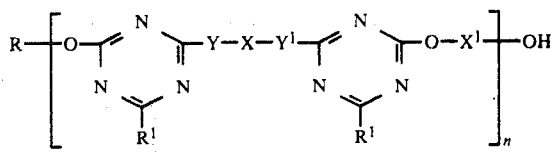

wherein at least one of the substituents contains a 4-piperidyl group are disclosed as light stabilizers for polymers.

This invention relates to certain novel compositions and to their use as light stabilizers for polymers. More particularly, this invention relates to novel oligomers of the formula (I)

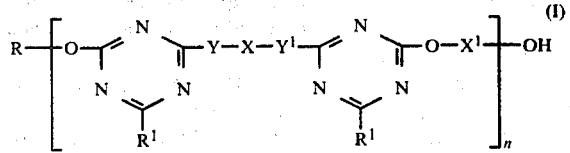

wherein R represents $C_1$–$C_8$ alkyl, $R^1$ represents $C_1$–$C_8$ alkoxy, $C_1$–$C_8$ alkyl, halo, $C_1$–$C_8$ alkylthio, amino, $C_1$–$C_{18}$ alkylamino, $C_1$–$C_{18}$ dialkylamino, morpholino, pyrrolidyl, piperidino, the groups,

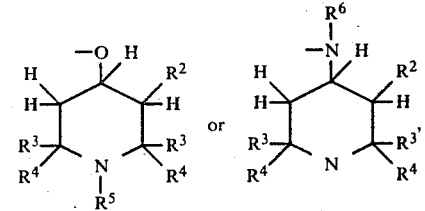

wherein $R^2$, $R^3$, $R^4$, $R^5$ and $R^6$ are as defined below, a substituted $C_1$–$C_{18}$ alkylamino or $C_1$–$C_{18}$ dialkylamino, wherein the substitutents are selected from amino, cyano, carboxy, alkoxycarbonyl wherein the alkoxy has 1 to 8 carbon atoms, and the groups

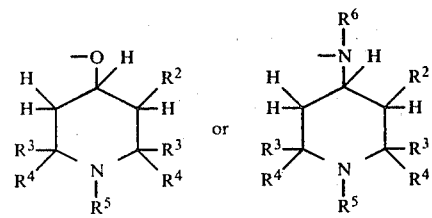

wherein $R^2$ represents hydrogen, $C_1$–$C_8$ alkyl, or benzyl; $R^3$ and $R^4$ independently represent $C_1$–$C_8$ alkyl, benzyl or phenethyl, or together with the carbon to which they are attached form a $C_5$–$C_{10}$ cycloalkyl, $R^5$ represents hydrogen, $C_2$–$C_3$ hydroxyalkyl, $C_1$–$C_8$ alkyl, hydroxyl, or oxyl; and $R^6$ represents hydrogen, $C_1$–$C_8$ alkyl, or

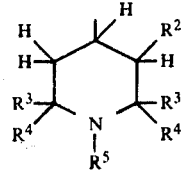

$Y$ and $Y^1$, which may be the same or different, represent oxy or

wherein $R^6$ is as previously defined; $X$ and $X^1$ represent $C_2$–$C_{18}$ alkylene, wherein the alkylene chain may be interrupted by one or more oxy, thio, or

radicals, $C_5$–$C_{10}$ cycloalkylene,

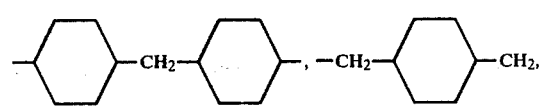

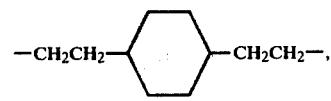

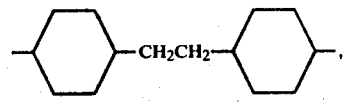

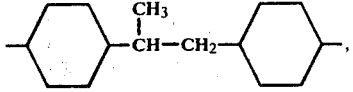

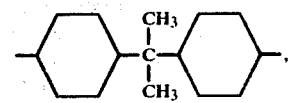

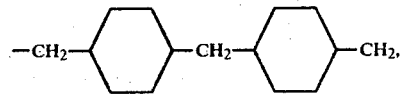

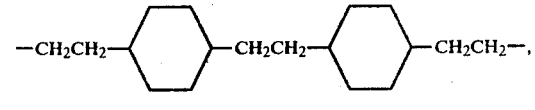

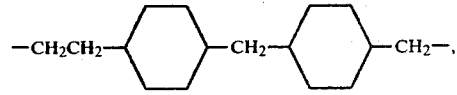

$C_6$–$C_{12}$ arylene, or $C_8$–$C_{14}$ aralkylene, and n is an integer greater than 1; with the proviso that when Y and $Y^1$ are oxy, or $R^6$ is hydrogen or $C_1$-$C_6$ alkyl, at least one $R^1$ is

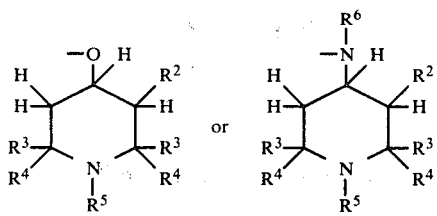

The invention also relates to the use of such oligomeric compositions for stabilizing polymers, particularly polyolefins, against degradation by ultraviolet radiation, and to the stabilized compositions resulting thereby.

The preferred compositions of formula (I) are those wherein Y and $Y^1$ are

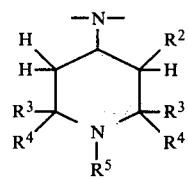

In the especially preferred compositions Y and $Y^1$ are

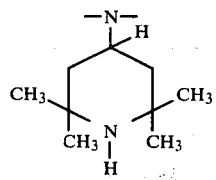

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polymers. Since none has been found to be completely satisfactory, research continues in order to find compounds, or combinations of compounds, which will be more satisfactory. The present invention arose out of such research and resulted in the discovery of novel compounds which stabilize polymers against degradation by ultraviolet light.

The stabilizers of the present invention offer the following advantages:
(1) excellent light-stabilizing activity,
(2) excellent compatibility with resins,
(3) low volatility,
(4) low extractability from polymers by laundering or dry cleaning, and
(5) excellent oven-aging stability.

The prior art includes such patents as: U.S. Pat. No. 2,481,156 discloses the preparation of linear polymer by reacting a 2-amino-4,6-dialkoxy-1,3,5-triazine and a polyhydric alcohol; U.S. Pat. No. 3,925,376 discloses 1,3,5-triazines containing a hindered piperidine moiety as light stabilizers for polymers; and U.S. Pat. No. 4,086,204 discloses polytriazine compounds containing tetraalkyl piperidine radicals prepared by reacting a dihalo-1,3,5-triazine with a bifunctional alcohol.

The oligomers of formula (I) may be prepared by reacting a compound of formula (II)

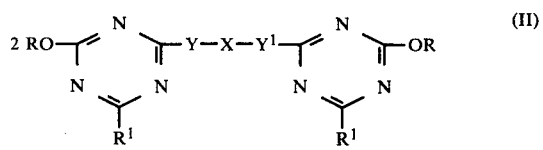

wherein R, $R^1$, Y, X, and $Y^1$ are as previously defined, with a diol of formula (III) HO—$X^1$—OH wherein $X^1$ is as previously defined, and catalyzed by an alkali metal or an alkali metal alkoxide, at an elevated temperature, and distilling off the by-product alcohol, or mixture of alcohols, under vacuum. The reaction mixture is held under vacuum at the elevated temperature to obtain a residue which may be subsequently pulverized, washed with water and dried.

The compounds of formula (II) may be prepared by reacting an appropriately substituted chloro-1,3,5-triazine of formula (IV) with an appropriately substituted diamine of formula (V), as illustrated by the following reaction, wherein R, $R^1$, X, Y, and $Y^1$ are as previously defined.

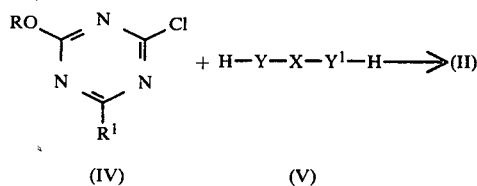

The preparation of suitable compounds of formulas (IV) and (V) is well-known in the art. The preparation of 4,4'-(hexamethylenediimino)bis(2,2,6,6-tetramethylpiperidine), also known as N,N'-bis(2,2,6,6-tetramethyl-4-piperidyl)hexamethylenediamine, is disclosed in U.S. Pat. No. 4,104,248.

Some compounds of formula (II) may be prepared by reacting a compound of formula (VI) with an appropriate amine or alcohol, as shown below.

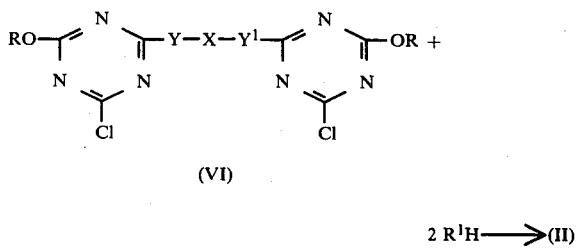

The compounds of formula (VI) may be prepared by reacting an appropriately RO-substituted dichloro-s-triazine and an appropriate diamine by conventional methods.

Illustrative examples of suitable compounds of formula (II) include the following:

2,2'-[ethylenebis[(2,2,6,6-tetramethyl-4-piperidinyl-)imino]]bis(4,6-dimethoxy-1,3,5-triazine),
2,2'-[tetramethylenebis[(2,6-di-n-butyl-2,6-dimethyl-4-piperidinyl)imino]]bis(4,6-diethoxy-1,3,5-triazine),
2,2'-[hexamethylenebis[(2,2,6,6-tetramethyl-4-piperidinyl)imino]]bis(4,6-dimethoxy-1,3,5-triazine),
2,2'-[thiodiethylenebis[(2,2,6,6-tetraethyl-4-piperidinyl-)imino]]bis(4,6-diethoxy-1,3,5-triazine),
2,2'-[oxydihexamethylenebis[(2,2,6,6-tetramethyl-4-piperidinyl)imino]]bis(4,6-dimethoxy-1,3,5-triazine),
2,2'-[tetramethylenebis[(1,2,2,6,6-pentamethyl-4-piperidinyl)imino]]bis(4,6-dimethoxy-1,3,5-triazine),
2,2'-[hexamethylenebis[(1-oxy-2,2,6,6-tetramethyl-4-piperidinyl)imino]]bis(4,6-dimethoxy-1,3,5-triazine),
2,2'-[hexamethylenebis[(1-hydroxy-2,2,6,6-tetramethyl-4-piperidinyl)imino]]bis(4,6-di-n-hexyloxy-1,3,5-triazine),
2,2'-[hexamethylenebis[(2,2,6,6-tetramethyl-4-piperidinyl)imino]]bis(6-diethylamino-4-methoxy-1,3,5-triazine),
2,2'-(hexamethylenediimino)bis[4-methoxy-6-(2,2,6,6-tetramethyl-4-piperidinyl)oxy-1,3,5-triazine],
2,2'-[iminodiethylene[(2,2,6,6-tetramethyl-4-piperidinyl)imino]]bis(4,6-di-n-butoxy-1,3,5-triazine),
2,2'-(hexamethylenediimino)bis[4-methoxy-6-(2,2,3,6,6-pentamethyl-4-piperidinyl)amino-1,3,5-triazine],
2,2'-[1,4-cyclohexylenebis(methylene)]bis[4-methoxy-6-(2-benzyl-2,6,6-trimethyl-4-piperidinyl)amino-1,3,5-triazine],
2,2'-[hexamethylenebis[(7-azadispiro[5.1.5.3]hexadecan-15-yl)imino]]bis(4,6-dimethoxy-1,3,5-triazine),
2,2'-(hexamethylenediimino)bis[4-methoxy-6-(7-azadispiro[5.1.5.3]hexadecan-15-yl)amino-1,3,5-triazine],
2,2'-[1,4-cyclohexylenebis[(2,2,6,6-tetramethyl-4-piperidinyl)imino]]bis(4,6-dimethoxy-1,3,5-triazine),
2,2'-[1,4-phenylenebis[(2,2,6,6-tetramethyl-4-piperidinyl)imino]]bis(4,6-diisopropoxy-1,3,5-triazine),
2,2'-[1,4-(phenylenedimethylene)bis[(2,2,6,6-tetramethyl-4-piperidinyl)imino]]bis(4,6-dimethoxy-1,3,5-triazine),
2,2'-(ethylenedioxy)bis[4-methoxy-6-(2,2,6,6-tetramethyl-4-piperidinyl)amino-1,3,5-triazine],
2,2'-(thiodiethylenedioxy)bis[4-methoxy-6-(2,2,6,6-tetramethyl-4-piperidinyl)oxy-1,3,5-triazine],
2,2'-[hexamethylenebis[(2-benzyl-2,6,6-trimethyl-4-piperidinyl)imino]]bis(4,6-dimethoxy-1,3,5-triazine),
2,2'-[hexamethylenebis[(2-phenethyl-2,6,6-trimethyl-4-piperidinyl)imino]]bis(4,6-dimethoxy-1,3,5-triazine),
2,2'-[hexamethylenebis[(2,2,6,6-tetramethyl-4-piperidinyl)imino]]bis(4-methoxy-6-t-octylamino-1,3,5-triazine),
2,2'-[iminobis[2,1-ethanediyl](2,2,6,6-tetramethyl-4-piperidinyl)imino]]bis(4,6-dimethoxy-1,3,5-triazine),
2,2'-[hexamethylenebis[(2,2,6,6-tetramethyl-4-piperidinyl)imino]]bis(4,6-di-n-butoxy-1,3,5-triazine),
2,2'-[ethylenebis[(2,2,6,6-tetramethyl-4-piperidinyl-)imino]]bis(4-methoxy-6-t-octylamino-1,3,5-triazine),
2,2'-[hexamethylenebis[(2,2,6,6-tetramethyl-4-piperidinyl)imino]]bis(4-amino-6-1,3,5-triazine),
2,2'-[hexamethylenebis[(2,2,6,6-tetramethyl-4-piperidinyl)imino]]bis(4-amino-6-methoxy-1,3,5-triazine),
2,2'-[methylenedi-4,1-cyclohexylenebis[(2,-2,6,6-tetramethyl-4-piperidinyl)imino]]bis(4-methoxy-6-t-octylamino-1,3,5-triazine),
2,2'-(hexamethylenediimino)bis[4-methoxy-6-[[6-[(2,2,6,6-tetramethyl-4-piperidinyl)amino]hexyl]amino]-1,3,5-triazine],
2,2'-(hexamethylenediimino)bis[4-methoxy-6-[[6-[(2,2,6,6-tetramethyl-4-piperidinyl)oxy]-hexyl]amino]-1,3,5-triazine,
2,2'(ethylenediimino)bis[4-methoxy-6-bis(2,2,-6,6-tetramethyl-4-piperdinyl)amino-1,3,5-triazine],
2,2'-(hexamethylenediimino)bis[4-methoxy-6-bis(2,2,6,6-tetramethyl-4-piperdinyl)amino-1,3,5-triazine],
and the like.

The preferred compounds of formula (II) are the 2,2'-[alkylenebis[(2,2,6,6-tetramethyl-4-piperidinyl-)imino]]bis(4,6-dialkoxy-1,3,5-triazines). An especially preferred compound of formula (II) is 2,2'-[hexamethylene-bis[(2,2,6,6-tetramethyl-4-piperidinyl)imino]]-bis(4,6-dimethoxy-1,3,5-triazine).

Suitable diols of formula (III), which may be used to prepare the polymers of formula (I), include the following:
1,2-ethanediol,
1,4-butanediol,
1,6-hexanediol,
1,12-dodecanediol,
1,16-hexadecanediol,
1,4-cyclohexanediol,
1,4-cyclohexanedimethanol,
2-methyl-1,4-cyclohexanedimethanol,
2-ethyl-1,3-hexanediol,
4,4'-isopropylidenedicyclohexanol,
1,4-cyclohexanediethanol,
2,2-dimethyl-1,3-propanediol,
4,4'-methylenedicyclohexanol,
1,4-dihydroxybenzene,
1,5-dihydroxynaphthalene,
2,2'-iminodiethanol,
2,2'-oxydiethanol,
2,2'-thiodiethanol,
1,4-benzenedimethanol,
1,5-naphthalenedimethanol,
and the like. The preferred diol is 1,4-cyclohexanedimethanol.

The oligomers of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

Other organic materials susceptible to degradation by the effects of light, the properties of which are improved by the incorporation therein of a polymer of this invention, include natural and synthetic rubbers; the latter include, for example, homo-, co- and terpolymers of acrylonitrile, butadiene and styrene, and blends thereof.

The oligomers of formula (I) are particularly useful in polyolefins, such as polyethylene, polypropylene, polybutylene, and the like, and copolymers thereof.

Generally, the compositions comprise a polymer containing from about 0.1% to about 5% by weight of the oligomer of formula (I) based on the weight of the polymer.

Preferably, the composition comprises a polyolefin containing from about 0.2% to about 2% by weight of the oligomer of formula (I), based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-bis(2,6-di-t-butylphenol); 4,4'-bis(2,6-diisopropylphenol); 2,4,6-tri-t-butylphenol; 2,2'-thiobis(4-methyl-6-t-butylphenol); octadecyl 2(3',5'-di-t-butyl-4'-hydroxyphenyl)-propionate; etc.; esters of thiodipropionic acid, such as dilauryl thiodipropionate and distearyl thiodipropionate, etc.; hydrocarbyl phosphites, such as triphenyl phosphite, trinonyl phosphite, diisodecyl pentaerythrityl diphosphite, diphenyldecyl phosphite, etc.; and combinations thereof.

Suitable supplemental light stabilizers include those of the benzotriazole class, such as 2-(2'-hydroxy5-t-octylphenyl)benzotriazole; 2-(2'-hydroxy-3',5'-di-t-butylphenyl)-5-chlorobenzotriazole; those of the hydroxybenzophenone type, such as 2-hydroxy-4-methoxybenzophenone; 2-hydroxy-4-octyloxybenzophenone; 2,2'-dihydroxy-4,-4'-dimethoxybenzophenone; hindered phenol esters, such as n-hexadecyl 3,5-di-t-butyl-4-hydroxybenzoate, and 2',4'-di-t-butylphenyl 3,5-di-t-butyl-4-hydroxybenzoate; metal complexes, such as nickel complexes of 2,2'-thiobis(4-t-octylphenol); nickel butylamine complex of 2,2'-thiobis(4-toctylphenol); nickel complexes of bis(4-t-octylphenyl)sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc.; nickel complex of 2-hydroxy-4-methylphenyl undecyl ketone oxime, etc. Further illustrative examples of suitable antioxidants and supplemental light stabilizers can be found in columns 3 and 4 of U.S. Pat. Nos. 3,488,290 and 3,496,134 and in the other patents mentioned therein.

As with the oligomer of formula (I), such additives are advantageously employed within the range from about 0.2% to about 2% by weight, based on the weight of the untreated polymer.

The oligomer of formula (I) may be incorporated into the polymeric substrate by any of the known techniques for compounding additives with a polymer. For example, the oligomer of formula (I) and the additive may be compounded by dry blending with the substrate in powder or granular form, followed by milling, Banbury mixing, molding, casting, extruding, swelling, and the like. Alternatively, the oligomer of formula (I) may be added, as a solution or slurry in a suitable inert solvent, or dispersant, to the polymeric substrate in powder or granular form, the whole mixed intimately in a mixer, and the solvent subsequently removed. As a further possibility, the oligomer of formula (I) may be added to the polymeric substrate during the preparation of the latter, for instance at the latex stage of polymer production, to provide prestabilized polymer material.

The following examples illustrate the present invention. All parts and percentages mentioned therein are by weight unless otherwise indicated.

EXAMPLE 1

1,4-Cyclohexanedimethanol (5.76 grams; 0.04 mole) and metallic sodium (0.08 gram; 0.0034 mole) are heated at 120° C. until all of the sodium is reacted; then, 2,2'-[hexamethylenebis[(2,2,6,6-tetramethyl-4-piperidinyl)imino]]bis(4,6-dimethoxy-1,3,5-triazine) (13.44 grams; 0.02 mole) is added thereto and the resulting mixture is heated at 140° C. for one hour while stirring and distilling under a vacuum of about 20-30 mms. The vacuum is then increased to 1-2 mms. and the temperature is slowly increased to 250° C. and held thereat for 2-3 hours. The resulting residue is pulverized, washed with warm water, and dried in a vacuum oven to obtain 11.0 grams of product having a molecular weight of 1029 which corresponds to n=1.53.

EXAMPLE 2

1,6-Hexanediol (1.18 gram; 0.01 mole) and metallic sodium (0.04 gram; 0.0017 mole) are heated at 120°–130° C., under nitrogen, until all of the sodium is reacted; then, 2,2'-[hexamethylenebis[(2,2,6,6-tetramethyl-4-piperidinyl)imino]]bis(4,6-dimethoxy-1,3,5-triazine) (6.72 grams; 0.01 mole) is added thereto and the resulting mixture is heated to 185° C. over a period of 2-3 hours while stirring and distilling under a vacuum of about 25 mms. The vacuum is then increased to 0.5 mm and the clear pale amber viscous liquid is heated to 240° C. over a period of about 1.5-2 hours. The resulting liquid is cooled to room temperature to obtain a clear pale amber resin. The product is pulverized in a mortar, slurried in tetrahydrofuran, filtered, washed with water, and dried in a vacuum oven at room temperature. The dried product softens at about 150° C. and melts at 255° C.

EXAMPLE 3

A slurry of 1,4-cyclohexanedimethanol (1.45 grams; 0.01 mole) and sodium methoxide (0.10 gram) is heated at 100° C. to dissolve most of the sodium methoxide, and the mixture is diluted with methanol to obtain a solution.

2,2'-[Hexamethylenebis[(2,2,6,6-tetramethyl-4-piperidinyl)imino]]bis(4-methoxy-6-t-octylamino-1,3,5-triazine) (8.7 grams; 0.01 mole), dissolved in hot methanol (800 mls), is added to the above solution and the resulting mixture is stirred and heated at 100° C. under a 25 mm vacuum to evaporate the solvent. The residue is then heated at 150° C. under vacuum and then at 240° C. for 2 hours to further remove liquid therefrom. The resulting residue is cooled to obtain a brittle solid which is pulverized by grinding, washed with water and dried in a vacuum oven (80° C.) at 0.5 mm. The product is soluble in hot toluene and melts at 150°–180° C.

EXAMPLE 4

1,4-Cyclohexanedimethanol (1.45 grams; 0.01 mole) and sodium methoxide (0.10 gram) are heated at 110° C. for 2 hours to obtain a solution. 2,2'-(Hexamethylenediimino)bis[4-methoxy-6-(2,2,6,6-tetramethyl-4-piperidinyl)amino-1,3,5-triazine] (6.4 grams; 0.01 mole) is added to the solution and the mixture is heated, while stirring, for 2 hours at 230°–240° C. under a vacuum of 0.1 mm. The mixture is then cooled to ambient temperature and the resulting solid is recovered by filtration, powdered, washed with 500–600 mls of water and dried, m.p. 210°–250° C.

EXAMPLES 5-8

Testing in Polypropylene

The products of Examples 1-4 (0.25 gram) are separately dry blended with a mastermix of 100 grams of unstabilized polypropylene (Pro-fax ® 6401) and 0.1 gram of a processing antioxidant, 2,4,6-tri-t-butylphenol. The blend is milled at 350°–370° F. for five minutes, and then compression molded at 400° F. into a film 4–5 mils thick. The film and a control film, identically prepared without the compound under test, are exposed to a xenon arc in an Atlas Weather-Ometer ® until they fail. A film is considered as having failed when the carbonyl content of the infrared absorption spectrum increases by 0.10-weight percent, a generally accepted point of film embrittlement.

The data in Table I show the number of hours required to increase the carbonyl content by 0.1% by weight for the compounds under test and a control film.

TABLE I

| Example | Additive | Hours to Failure |
|---|---|---|
| 5 | Product of Example 1 | 600 |
| 6 | Product of Example 2 | 500 |
| 7 | Product of Example 3 | — |
| 8 | Product of Example 4 | — |
|   | None | <200 |

What is claimed is:

1. An oligomer of the formula:

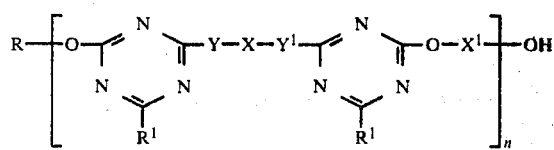

wherein R represents $C_1$–$C_8$ alkyl; $R^1$ represents $C_1$–$C_8$ alkoxy, $C_1$–$C_8$ alkyl, halo, $C_1$–$C_8$ alkylthio, amino, $C_1$–$C_{18}$ alkylamino, $C_1$–$C_{18}$ dialkylamino, morpholino, pyrrolidyl, piperidino the groups

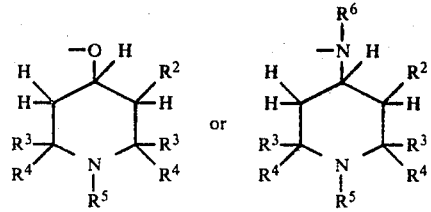

wherein $R^2$, $R^3$, $R^4$, $R^5$ and $R^6$ are as defined below, a substituted $C_1$–$C_{18}$ alkylamino or $C_1$–$C_{18}$ dialkylamino, wherein the substitutents are selected from amino, cyano, carboxy, alkoxycarbonyl wherein the alkoxy moiety has 1–8 carbon atoms, and the groups

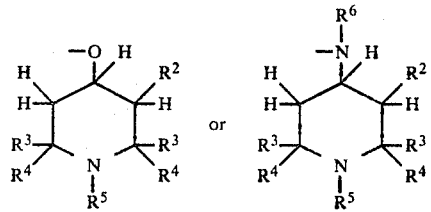

wherein $R^2$ represents hydrogen, $C_1$–$C_8$ alkyl, or benzyl; $R^3$ and $R^4$ independently represent $C_1$–$C_8$ alkyl, benzyl, or phenethyl, or together with the carbon to which they are attached form a $C_5$–$C_{10}$ cycloalkyl; $R^5$ represents hydrogen, $C_2$–$C_3$ hydroxyalkyl, $C_1$–$C_8$ alkyl, hydroxyl, or oxyl; and $R^6$ represents hydrogen, $C_1$–$C_8$ alkyl or

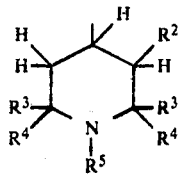

$Y$ and $Y^1$, which may be the same or different, represent oxy or

wherein $R^6$ is as previously defined; $X$ and $X^1$ represent $C_2$–$C_{18}$ alkylene, wherein the alkylene chain may be interrupted by one or more oxy, thio, or

radicals, $C_5$–$C_{10}$ cycloalkylene,

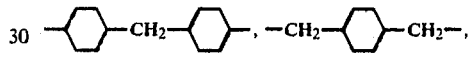

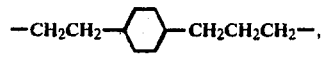

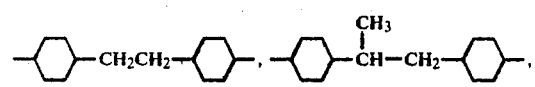

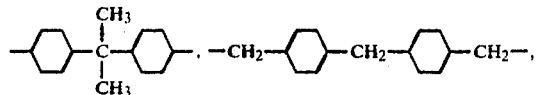

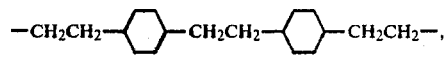

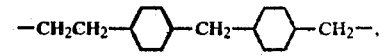

$C_6$–$C_{12}$ arylene, or $C_8$–$C_{14}$ aralkylene, and n is an integer greater than 1; with the proviso that when Y and $Y^1$ are oxy, or $R^6$ is hydrogen or $C_1$–$C_{16}$ alkyl, at least one $R^1$ is

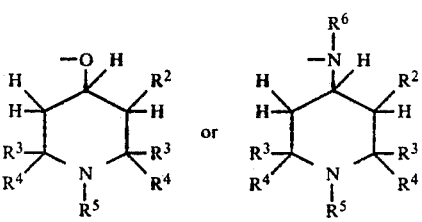

2. The oligomer of claim 1 wherein Y and $Y^1$ are each

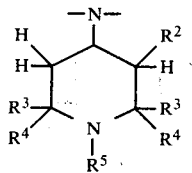

3. The oligomer of claim 1 wherein Y and Y¹ are each

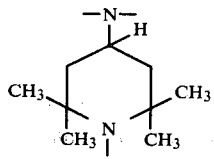

4. The oligomer of claim 1 wherein R is —CH₃.

5. The oligomer of claim 1 wherein R¹ is selected from CH₃O—, t-octylamino, and (2,2,6,6-tetramethyl-4-piperidinyl)imino.

6. The oligomer of claim 1 wherein X is $C_2$-$C_{18}$ alkylene.

7. The oligomer of claim 1 wherein —Y—X—Y¹— is

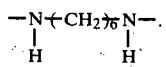

8. The oligomer of claim 1 wherein X¹ is

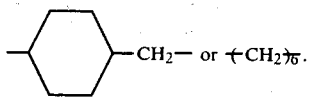

9. A method for stabilizing a polymer which is normally subject to degradation by ultraviolet radiation which comprises incorporating into said polymer an ultraviolet stabilizingly effective amount of an oligomer of claim 1.

10. The method of claim 9 wherein the oligomer is incorporated in a concentration of from about 0.2 to 2% by weight based on the weight of the polymer.

11. The method of claim 7 wherein the polymer is a polyolefin.

12. The method of claim 11 wherein the polyolefin is polypropylene.

13. The method of claim 9 wherein the oligomer is that of claim 2.

14. The method of claim 9 wherein the oligomer is that of claim 3.

15. The method of claim 9 wherein the oligomer is that of claim 4.

16. The method of claim 9 wherein the oligomer is that of claim 5.

17. The method of claim 9 wherein the oligomer is that of claim 6.

18. The method of claim 9 wherein the oligomer is that of claim 7.

19. The method of claim 9 wherein the oligomer is that of claim 8.

20. The compositions produced by the method of claims 9, 10, 11, 12, 13, 14, 15, 16, 17, 18, or 19.

* * * * *